2,897,056

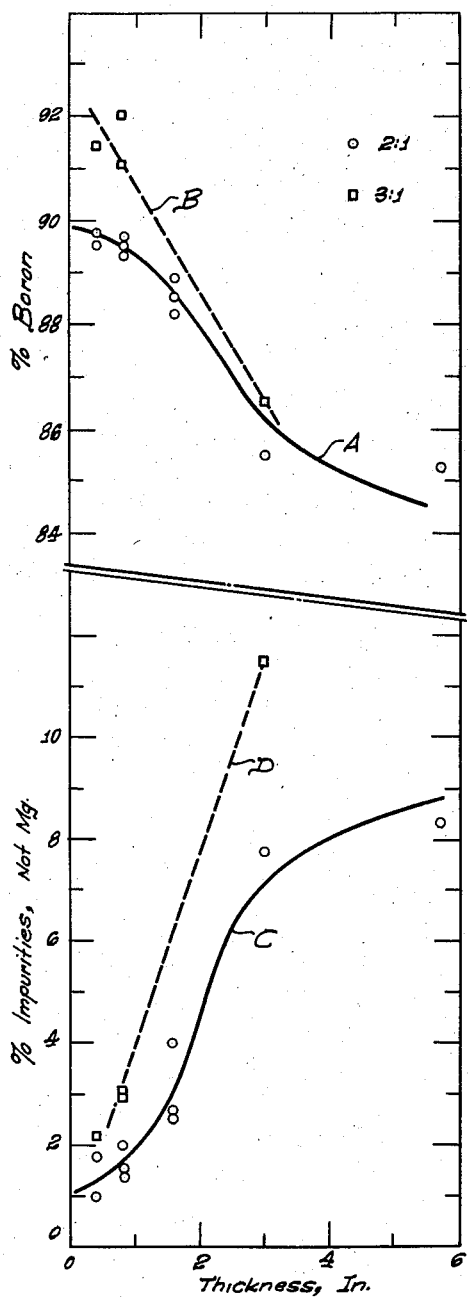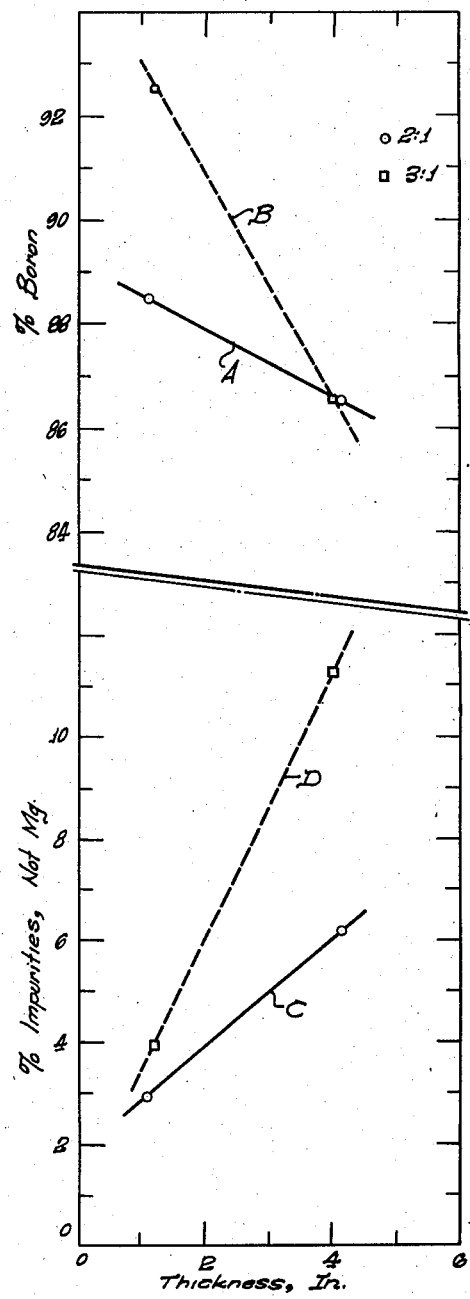
Nelson P. Nies,
Edgar W. Flajans,
Inventors.

Patented July 28, 1959

2,897,056
PRODUCTION OF ELEMENTAL BORON BY MAGNESIUM REDUCTION

Nelson P. Nies, Pasadena, and Edgar W. Fajans, Los Angeles, Calif., assignors to United States Borax & Chemical Corporation, Los Angeles, Calif., a corporation of Nevada Application October 18, 1956, Serial No. 616,774

3 Claims. (Cl. 23—209)

This invention is concerned with improvements in the production of elemental boron by the Moissan process, which involves chemical reaction of boron trioxide and magnesium.

An intimate mixture of solid particulate boron trioxide and magnesium reacts when elevated to a sufficiently high temperature. The reaction, once initiated, has a large positive heat of reaction, and tends to spread in an orderly manner throughout the mass of the reaction mixtures. After cooling, the resulting mass may be broken up and extracted with hot dilute acid to produce elemental boron of fair purity.

In an effort to improve the purity of elemental boron produced by the Moissan process, some workers have attemped to exclude atmospheric oxygen from the reaction vessel, as by employing a vacuum or an atmosphere of inert gas such as argon; and it appears to have been the universal practice to carry out the reaction in a relatively deep crucible in order to minimize the surface area of the reacting mass and thus reduce the possibility of reactions with the atmosphere and with the walls of the container.

It has now been discovered, in direct conflict with such previous practice, that a superior product is obtainable by arranging the reaction mixture in a form having substantially maximum feasible surface area, even though this large surface area is exposed to the atmosphere. More precisely, it has been found that all parts of the reaction mixture should lie within a relatively small distance of a boundary surface of the reaction mass. Whereas the mass must be of such form as to have at least one dimension relatively small, there is no maximum limit on the other dimensions. Hence, practical large scale production can be achieved in accordance with the invention by employing a reaction mass that is small in one dimension, but that is large in one or both of its other dimensions.

The small dimension of the reaction mass, which will be referred to as its thickness, is preferably substantially as small as is feasible without making the process impracticable; and is, in any case, less than about three inches. By thus arranging the reaction mass in a thin layer of relatively large area, the purity of the resulting elemental boron can be appreciably improved.

Arrangement of the reaction mixture in a thin layer has the additional advantages that the mixture may be heated more rapidly to the desired temperature and that the clinker produced by the reaction cools more rapidly and may be more readily removed from the container. Those advantages facilitate large scale production in a continuous process.

Further, a procedure has been discovered for obtaining the economy of providing the magnesium as metal turnings rather than as magnesium powder without sacrificing the superior purity attained by the invention. When a mixture of magnesium turnings and boron trioxide is heated in a furnace, a temperature of 1000° C. or more may be required to initiate the reaction, and in this case the resulting elemental boron is of inferior quality. And if that reaction mixture is not preheated it is difficult to initiate the reaction and impracticable to carry it to completion. However, we have discovered that highly satisfactory results are obtainable by preheating a reaction mixture of boron trioxide and magnesium turnings to a temperature that is at least about 400° C. and that is not higher than about 700° C. The reaction can then be initiated readily by applying a flame directly to a surface of the reaction mixture; and, once initiated, the reaction spreads uniformly throughout the moderately preheated mixture. Moreover, with such moderate preheating, elemental boron of superior quality can be produced with magnesium turnings.

The remarkable effectiveness of the invention in producing elemental boron of improved purity is typically shown in the accompanying drawing, in which:

Fig. 1 is a graph in which curves A and B represent the purity in percent of boron, and curves C and D represent the percentage concentration of impurities other than magnesium, both plotted aginst thickness of reacting layer, for elemental boron produced by the Moissan process from $B_2O_3$ and magnesium turnings; and Fig. 2 is a similar graph for elemental boron produced from $B_2O_3$ and magnesium powder.

The numerical values represented in the drawing are also listed in the accompanying Table 1 and Table 2, which correspond to Fig. 1 and Fig. 2, respectively.

The boron trioxide was provided in anhydrous form with substantially all particles passing a 60 mesh U.S. Standard sieve. Magnesium was provided either as machine turnings of substantially pure magnesium metal (Fig. 1 and Table 1) or as magnesium powder of approximately minus 50 mesh (Fig. 2 and Table 2). The magnesium turnings were typically about 5 to 20 mils thick, 0.05 to 0.15 inch wide and 0.2 to 0.5 inch long. With each type of magnesium, reactions were carried out at weight ratios of $B_2O_3$ to Mg of both 2:1 and 3:1, as indicated in the figures and tables. Weight ratios approximately within the range indicated by those values are preferred.

*Table 1.—Magnesium Turnings*

| Run | Weight, lbs. | Weight ratio $B_2O_3$/Mg | Heating temperature, degrees C. | Thickness, ins. | Percent boron | Percent impur. not Mg |
|---|---|---|---|---|---|---|
| 1 | 5.25 | 2:1 | 570 | 0.4 | 89.6 | 1.0 |
| 2 | 5.25 | 2:1 | 620 | 0.4 | 89.8 | 1.8 |
| 3 | 10.5 | 2:1 | 600 | 0.8 | 89.4 | 1.4 |
| 4 | 10.5 | 2:1 | 530 | 0.8 | 89.5 | 1.4 |
| 5 | 10.5 | 2:1 | 520 | 0.8 | 89.6 | 2.0 |
| 6 | 21 | 2:1 | 510 | 1.6 | 88.5 | 4.0 |
| 7 | 21 | 2:1 | 600 | 1.6 | 88.9 | 2.7 |
| 8 | 21 | 2:1 | 530 | 1.6 | 88.2 | 2.6 |
| 9 | 39 | 2:1 | 530 | 3.0 | 85.5 | 7.8 |
| 10 | 75 | 2:1 | 450 | 5.7 | 85.3 | 8.3 |
| 11 | 5 | 3:1 | 600 | 0.4 | 91.4 | 2.2 |
| 12 | 10 | 3:1 | 550 | 0.8 | 91.1 | 3.0 |
| 13 | 10 | 3:1 | 500 | 0.8 | 92.0 | 3.0 |
| 14 | 40 | 3:1 | 500 | 3.0 | 86.5 | 11.5 |

*Table 2.—Magnesium Powder*

| Run | Weight, lbs. | Weight ratio $B_2O_3$/Mg | Heating temperature, degrees C. | Thickness, ins. | Percent boron | Percent impur. not Mg |
|---|---|---|---|---|---|---|
| 15 | 1.6 | 2:1 | 600 | 1.1 | 88.5 | 2.9 |
| 16 | 6 | 2:1 | 600 | 4.1 | 86.6 | 6.2 |
| 17 | 1.8 | 3:1 | 700 | 1.2 | 92.6 | 3.9 |
| 18 | 6 | 3:1 | 700 | 4.0 | 86.6 | 11.0 |

The reactions represented in Fig. 1 and listed in Table 1 were carried out in flat steel pans approximately 20 inches square and 8 inches deep, with slightly sloping sides. The reactions represented in Fig. 2 and Table 2 were carried out in steel pans having a flat bottom approximately 6 by 8 inches and having slightly sloping sides about 4 inches high. The latter type of container is smaller than the preferred size, but is believed to provide entirely reliable comparison of various depths of reaction layers. It is preferred to employ a layer of reaction mixture of large enough area that the greater part of the reaction takes place by natural spreading through the mixture, thereby minimizing the proportion of the mixture which must be directly contacted by the igniting flame. That purpose is typically accomplished by a reaction layer having an area of at least about one square foot.

In each instance, the reaction mixture, comprising granular $B_2O_3$ and either magnesium metal turnings or magnesium powder, was thoroughly mixed and spread uniformly over the bottom of the container. The total weight of reaction mixture employed for each run is given in pounds in the tables, and the measured depth of the reaction mixture in the container prior to heating is given in inches.

The filled container was heated in a furnace to a temperature of about 400 to 700° C. The approximate temperatures of the reaction mixture after heating are given in the tables. The heating time required varied from a few minutes for the thinner layers to about 30 or 40 minutes for the thicker layers. After preheating to the moderate temperatures indicated, the reaction was initiated by applying an open flame for a few seconds directly to the surface of the reaction mixture. The reaction was then ordinarily self-propagating throughout the reaction mixture. In the runs with the thinnest layers of reactants it was sometimes necessary to start the reaction more than once in order to carry it to completion. For that reason, it is preferred to provide a layer thickness of at least about one half inch.

Following the chemical reaction of boron trioxide and magnesium, the resulting clinker was allowed to cool and was then removed from the reaction vessel by inverting the vessel and sharply rapping its bottom. The clinker could then readily be broken up to a convenient size for recovery of the elemental boron from other products of the reaction. After a preliminary leaching in hot excess dilute sulfuric acid, the reaction product was typically boiled for two to five hours in 5 to 15% sulfuric acid, then washed and dried.

The resulting elemental boron was analyzed for boron by fusion with sodium carbonate and titration as $B_2O_3$, and for magnesium by compleximetric titration with the sodium salt of ethylene diamine tetraacetic acid (Versenate). The percentage concentration of impurities other than magnesium in the elemental boron was obtained by differences, and is plotted in curves C and D of the figures.

As is particularly clear from the accompanying figures, it has been discovered that the Moissan process leads to elemental boron of superior quality when the reaction mixture is arranged in a body having substantially the minimum thickness at which the reaction is self-propagating. As has already been pointed out, that arrangement of the reaction mixture is directly contrary to previous practice, and would be expected to lead to increased contamination of the product, particularly with impurities other than magnesium.

In the preferred manner of carrying out the invention in actual practice, the reaction layer is made somewhat thicker than the minimum dimension represented in Fig. 1, both to insure completeness of the reaction and to reduce the required container area per unit of final product. In view of such practical considerations, the layer thickness is preferably between about one half inch and about two inches; and in any case is less than about three inches, above which value the quality of the product is seen to be appreciably reduced.

The reason for the remarkable and unexpected effectiveness of the invention in producing elemental boron of superior quality is not fully understood. It seems likely that when all parts of the reaction mixture are close to a boundary surface the heat produced by the reaction can escape more readily, and the maximum temperature reached as a result of the reaction is thereby reduced. Also the reaction mixture is at a high temperature for a shorter time under these conditions. In any case, the Moissan process is found to operate more reliably and to yield a superior product when the reaction mixture is arranged in the manner that has been described.

The examples that have been given are intended only as illustrations of the invention, and particulars of those examples are not intended as limitations upon the scope of the invention, which is defined in the appended claims.

We claim:
1. The method of producing high purity elemental boron which comprises intimately admixing finely divided anhydrous $B_2O_3$ and particulate magnesium to form a reaction mass, arranging said reaction mass in a layer having as its smallest dimension a thickness of from about ½ inch to about 2 inches, preheating said admixture at a temperature of from about 400° to about 700° F., initiating the reaction by directing an open flame upon a portion of the surface of said reaction mass, removing the flame once the reaction starts and recovering elemental boron produced by the reaction.

2. The method of claim 1 which comprises mixing the $B_2O_3$ and magnesium in a weight ratio of from about 2 to 1 to about 3 to 1.

3. The method of claim 1 in which the particulate magnesium is substantially minus 50 mesh.

References Cited in the file of this patent

UNITED STATES PATENTS

| | | |
|---|---|---|
| 997,879 | Weintraub | July 11, 1911 |
| 1,019,392 | Weintraub | Mar. 5, 1912 |
| 2,592,809 | Kralovec et al. | Apr. 15, 1952 |

OTHER REFERENCES

Jacobson: "Encyclopedia of Chemical Reactions," vol. IV, page 397, IV-1641.